T. L. EASLEY.
NUT REMOVING DEVICE.
APPLICATION FILED JUNE 8, 1912.

1,051,713.

Patented Jan. 28, 1913.

Inventor
T. Larimore Easley.

Witnesses
Wm H. Mulligan.

By Victor J. Evans.
Attorney

UNITED STATES PATENT OFFICE.

THOMAS L. EASLEY, OF SAN ANTONIO, TEXAS.

NUT-REMOVING DEVICE.

1,051,713. Specification of Letters Patent. Patented Jan. 28, 1913.

Application filed June 8, 1912. Serial No. 702,581.

*To all whom it may concern:*

Be it known that I, THOMAS L. EASLEY, a citizen of the United States, residing at San Antonio, in the county of Bexar and State of Texas, have invented new and useful Improvements in Nut-Removing Devices, of which the following is a specification.

An object of the invention is to provide a device for removing nuts from vehicle axles and the like.

The invention embodies, among other features, a device adapted for clamping engagement with the hub of a vehicle, the said device being provided with clamping dogs for clamping engagement with the nut on the axle of the vehicle, the entire device being then rotated relatively to the hub to impart rotation to the nut on the axle of the vehicle.

Figure 1:
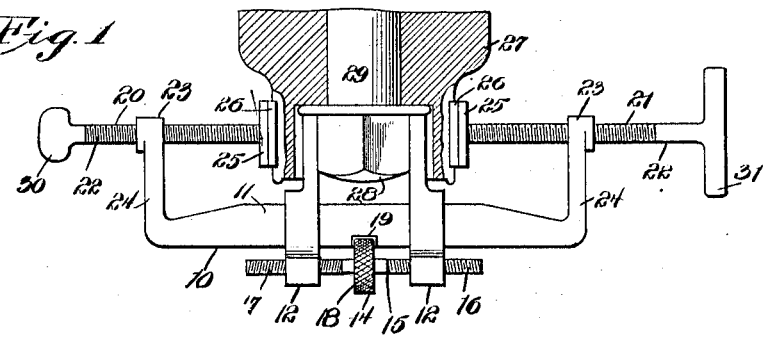
Figure 2:
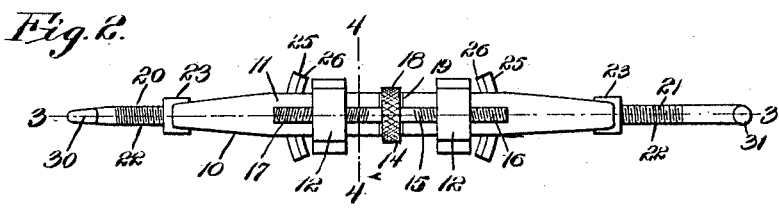
Figure 3:
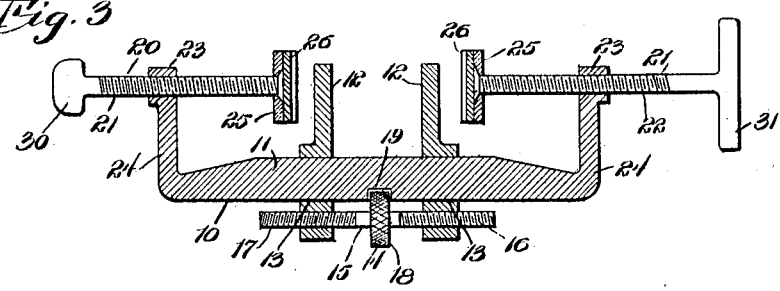
Figure 4:
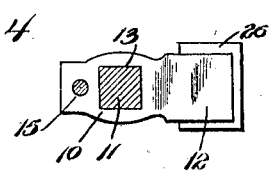

In the further disclosure of the invention reference is to be had to the accompanying drawings constituting a part of this specification, in which similar characters of reference denote corresponding parts in all the views, and in which:

Figure 1 is a plan view of the device, showing the same mounted on the hub of a vehicle, parts being broken away to disclose the underlying structure; Fig. 2 is a front elevation; Fig. 3 is a horizontal sectional view taken on the line 3—3 in Fig. 2; and Fig. 4 is a vertical transverse sectional view taken on the line 4—4 in Fig. 2.

Referring more particularly to the views, I employ a U-shaped frame 10 having mounted to slide on the central portion 11 thereof a plurality of clamping dogs 12, the mentioned central portion 11 being substantially enlarged in cross sectional area to form a convenient slide for the dogs 12, the dogs 12 being provided with openings 13, through which the central portion 11 of the U-shaped frame 10 is adapted to pass, an adjusting member 14 being provided for adjusting the dogs 12 on the portion 11 of the frame 10, the mentioned adjusting member consisting of a screw 15 having right-hand threads 16 at one end and left-hand threads 17 at the other end thereof, a knurled member 18 being formed with or keyed to the screw 15 at the central portion thereof for the purpose of imparting rotation to the screw, the threaded ends of the screw having threaded connection with the dogs 12 to advance the same on the central portion 11 of the U-shaped frame 10, a notch 19 being formed in the central portion 11 of the frame and into which a portion of the knurled member 18 is adapted to extend, thus retaining the knurled member in substantially central position relatively to the frame 10. Clamping members 20, 21 are mounted on the U-shaped frame 10, the said members each consisting of a shank 22 having threaded connection with a bearing 23, the said bearings being formed on laterally bent ends 24 of the frame 10, the mentioned shanks 22 being adapted to extend substantially parallel to the central portion of the frame 10 and having swivelly mounted on the inner ends thereof suitable jaws 25 provided with cushions 26, the mentioned jaws and cushions being slightly bent to conform to the periphery of a hub 27 having a nut 28 mounted on an axle 29 extended through the hub 27 as shown. The other end of the clamping member 20 is provided with a knob 30 for the purpose of turning the shank 22 to advance the jaw on the mentioned clamping member into clamping position, a suitable handle 31 being provided on the other end of the clamping member 21 for the purpose of advancing the jaw on the said clamping member into clamping position and also for the purpose of rotating the entire device on the hub 27.

In the application of the device, the clamping dogs 12 are mounted to extend within the hub 27, after which the knurled member 18 is turned to move the clamping dogs 12 into clamping engagement with the nut 28. When this has been accomplished, the knob 30 is turned to move the jaw 25 thereof into clamping engagement with the periphery of the hub 27 and the handle 31 is then rotated to move the jaw of the clamping member having the handle thereon into clamping engagement with the periphery of the hub 27, it being understood, however, that the jaws are not moved into rigid clamping engagement with the hub but are simply tightened up sufficiently to hold the frame 10 in place, the cushions 26 of the jaws being adapted to directly contact with the periphery of the hub. The handle 31 is now grasped and the entire device, including the frame 10, is rotated on the hub, thus resulting in the removal of the nut 28 from the axle 29, the clamping dogs 12 having been previously secured in clamping engagement with the nut. The nut 28 can be readjusted on the axle 29 in the same manner that the nut had been previously removed therefrom, and it will be readily understood that when the device has once been adjusted to remove one nut from one of the axles of the vehicle, the device can be easily applied to the other hubs of the vehicle to remove the other nuts on the other axles thereof or other portions of the heretofore mentioned axles, it being further seen that the operation of removing a nut from the axle or reinstating the nut on the axle, with the use of my device, can be accomplished without soiling the hands or the clothes of the operator.

Having thus described my invention, I claim:

1. In a device of the class described, the combination with a U-shaped frame, of clamping dogs mounted to slide on the central portion thereof, an adjusting member for adjusting the said clamping dogs on the said frame, the said adjusting member consisting of a screw provided with right-hand and left-hand threads for engagement with the said clamping dogs and having a knurled member rigid therewith for the purpose of operating the said screw, a portion of the said knurled member being adapted to extend into a notch formed in the said U-shaped frame, and clamping members having threaded connection with the said frame, the inner ends of the said clamping members being adapted for clamping engagement with a hub when the said clamping dogs have been moved into clamping engagement with a nut arranged within the said hub.

2. In a device of the class described, the combination with a U-shaped frame, of clamping dogs mounted to slide thereon, means for adjusting the said clamping dogs on the said frame, clamping members having threaded connection with the said frame, jaws formed on the inner ends of the said clamping members, cushions on the said jaws, a knob on one of the said clamping members for advancing the clamping member into clamping position, and a handle on the other clamping member for advancing the clamping member into clamping position and for imparting rotation to the said frame.

3. In a device of the class described, the combination with a U-shaped frame, of clamping dogs mounted to slide thereon, an adjusting member having threaded connection with the said dogs for adjusting the same on the said frame, clamping members having threaded connection with the said frame, cushions on the inner ends of the said clamping members, a knob on one of the clamping members for advancing the same into clamping position, and a handle on the other clamping member for advancing the same into clamping position and for imparting rotation to the said frame.

In testimony whereof I affix my signature in presence of two witnesses.

THOMAS L. EASLEY.

Witnesses:
OSCAR C. DANCY,
GUY DANCY.

---

Copies of this patent may be obtained for five cents each, by addressing the "Commissioner of Patents, Washington, D. C."